United States Patent [19]

Grubba

[11] Patent Number: 5,795,929
[45] Date of Patent: Aug. 18, 1998

[54] POLYMER ENHANCED ASPHALT EMULSION

[75] Inventor: William E. Grubba, Red Lion, Pa.

[73] Assignee: Koch Enterprises, Inc., Wichita, Kans.

[21] Appl. No.: 837,727

[22] Filed: Apr. 22, 1997

[51] Int. Cl.$^6$ ........................................... C08L 95/00
[52] U.S. Cl. ........................ 524/60; 524/59; 524/61; 524/68
[58] Field of Search .................... 524/60, 61, 68, 524/59

[56] References Cited

U.S. PATENT DOCUMENTS

| | | | |
|---|---|---|---|
| H876 | 1/1991 | Gilmore et al. | 524/68 |
| 4,145,322 | 3/1979 | Maldonado et al. | 260/28.5 |
| 4,242,246 | 12/1980 | Maldonado et al. | 260/28.5 |
| 4,330,449 | 5/1982 | Maldonado et al. | 524/68 |
| 4,418,167 | 11/1983 | Böhm et al. | 524/68 |
| 4,419,469 | 12/1983 | Böhm et al. | 524/68 |
| 4,464,427 | 8/1984 | Barlow | 428/40 |
| 4,530,652 | 7/1985 | Buck et al. | 428/291 |
| 4,554,313 | 11/1985 | Hagenbach et al. | 525/54.5 |
| 4,559,267 | 12/1985 | Freshwater et al. | 428/352 |
| 4,824,880 | 4/1989 | Algrim et al. | 524/62 |
| 4,835,199 | 5/1989 | Futamura et al. | 524/66 |
| 4,923,913 | 5/1990 | Chich et al. | 524/62 |
| 4,973,615 | 11/1990 | Futamura et al. | 524/66 |
| 5,036,119 | 7/1991 | Berggren | 523/351 |
| 5,100,938 | 3/1992 | Vitkuske et al. | 524/68 |
| 5,100,939 | 3/1992 | Vitkuske et al. | 524/68 |
| 5,182,319 | 1/1993 | Mitchell | 524/68 |
| 5,266,615 | 11/1993 | Omeis et al. | 524/69 |
| 5,272,214 | 12/1993 | Custro et al. | 525/314 |
| 5,288,773 | 2/1994 | Gorbaty et al. | 524/68 |
| 5,314,935 | 5/1994 | Chaverot et al. | 524/64 |
| 5,328,943 | 7/1994 | Isobe et al. | 524/70 |
| 5,342,866 | 8/1994 | Trumbore et al. | 524/68 |
| 5,371,121 | 12/1994 | Bellomy et al. | 524/68 |
| 5,380,552 | 1/1995 | George et al. | 427/186 |
| 5,380,773 | 1/1995 | Bellio et al. | 524/68 |
| 5,393,819 | 2/1995 | Peters | 524/406 |
| 5,399,598 | 3/1995 | Peters | 524/68 |

FOREIGN PATENT DOCUMENTS

| | | |
|---|---|---|
| 76 24107 | 3/1978 | France. |
| WO 9419022 | 4/1994 | WIPO. |

*Primary Examiner*—Peter A. Szekely
*Attorney, Agent, or Firm*—Shook, Hardy & Bacon, LLP

[57] ABSTRACT

The present invention relates to an asphalt composition prepared from bitumen (asphalt), linear and non-linear copolymers of styrene and butadiene, cross-linking agents, and emulsifiers. The present invention compositions are useful for industrial applications, such as hot-mix and emulsified asphalts used with aggregates for road paving, and repair.

19 Claims, 1 Drawing Sheet

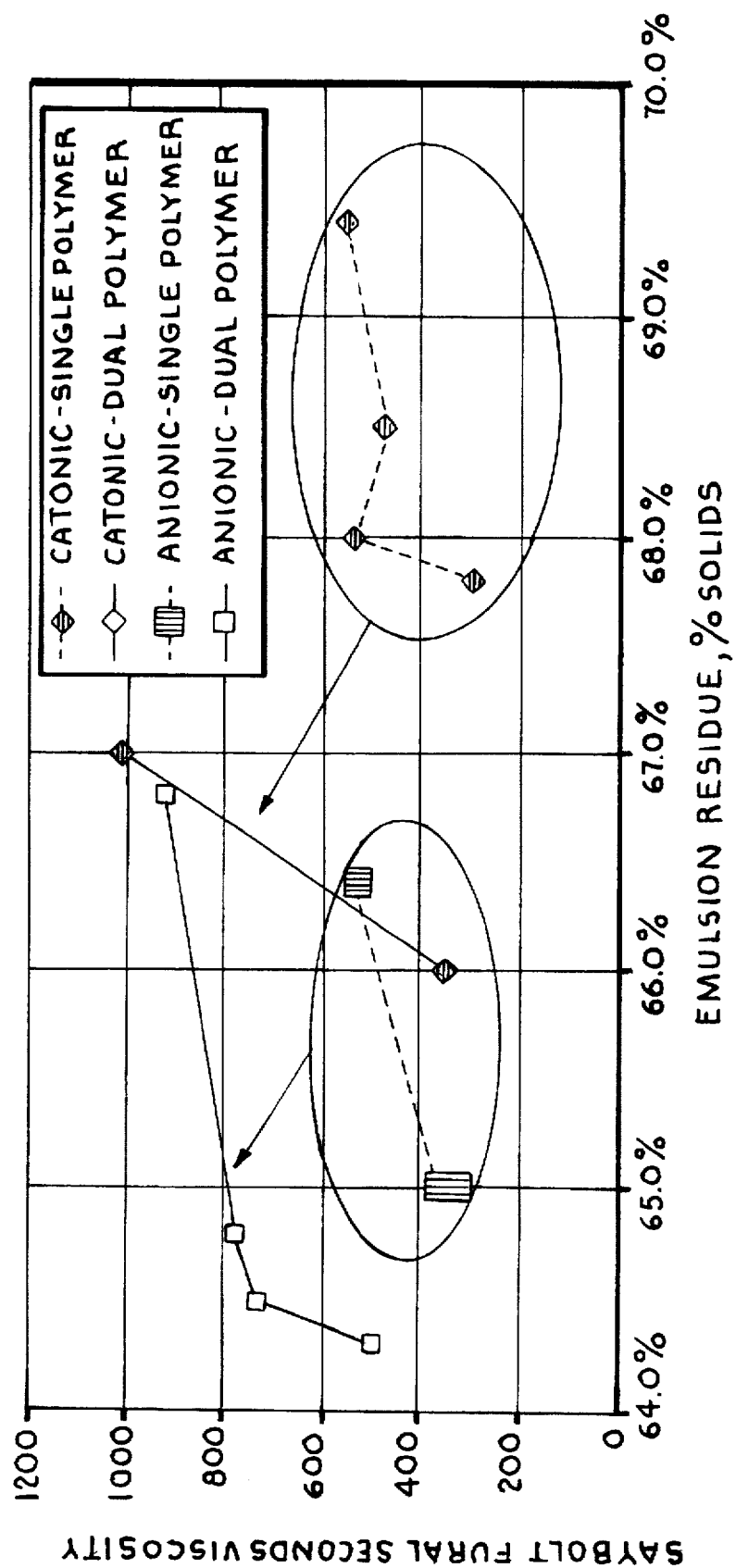

5,795,929

1

POLYMER ENHANCED ASPHALT EMULSION

FIELD OF INVENTION

The present invention relates to a novel process for producing polymer-enhanced asphalt emulsion and the product of that process. More particularly, the invention relates to a unique cross-linked dual copolymer and asphalt (bitumen) emulsion and process.

BACKGROUND OF INVENTION

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

Previously, various polymers have been added to asphalts to improve physical and mechanical performance properties. Polymer-modified asphalts are routinely used in the road construction/maintenance and roofing industries. Conventional asphalts often do not retain sufficient elasticity in use and, also, exhibit a plasticity range which is too narrow for use in many modern applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics.

The bituminous binders, even of the bitumen/polymer type, which are employed at the present time in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration. Current practice is to add the desired level of a single polymer, sometimes along with a reactant which promotes cross-linking of the polymer molecules until the desired asphalt properties are met. This reactant typically is sulfur in a form suitable for reacting. Such current processes are discussed in various patents such as U.S. Pat. Nos. 4,145,322 (Maldonado); 5,371,121 (Bellamy); and 5,382,612 (Chauerat), all of which are hereby incorporated by reference. However, cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

One result of the high viscosities experienced at increased polymer concentrations is that it makes emulsification of the asphalt difficult. As is known in the art and used herein, emulsification of asphalt refers to forming an emulsion of asphalt and water. Asphalt emulsions are desirable in many applications because the emulsion may be applied at lower temperatures than hot-mix asphalts because the water acts as a carrier for the asphalt particles. For example, hot-mix asphalts, mixes of asphalt, aggregate, and a single polymer, commonly are applied at a temperature of 350° Fahrenheit (F.) to 450° F. (177° Centigrade (C.) to 232° C.) to achieve the requisite plasticity for application. In comparison, an asphalt emulsion typically may be applied at 130° F. to 170° F. (54° C. to 77° C.) to achieve the same working characteristics. Once applied, the water evaporates, leaving the asphalt. Also, emulsified asphalt products generally do not use or release the environmentally-harmful volatile organic compounds normally associated with asphalts diluted with light carrier solvents such as diesel fuel, naphtha, and the like. Emulsification basically requires that the asphalt and any desired performance-enhancing additives be combined with an emulsifying agent in an emulsification mill along with about 20 to 40 percent by weight of water. However, high polymer loadings in an asphalt produce high viscosities and melting points making emulsification of the polymer-asphalt composition difficult. Thus, emulsification of the prior art single polymer composition effectively is limited to lower polymer concentrations not producing excessively viscous (stiff) working asphalt-polymer fluids.

SUMMARY OF INVENTION

It is, therefore, an object of this invention to provide a polymer-enhanced asphalt which minimizes the use of polymer additives required to achieve desired final viscosity and ductility characteristics.

It is a related object of this invention to provide a polymer-enhanced asphalt which is readily emulsified while maintaining a broad range of final viscosity and ductility characteristics.

It is a further object of this invention to produce an emulsion with improved characteristics for handling and application.

It is another object of this invention to minimize total cost of producing an asphalt polymer blend with given performance characteristics.

These and other objects of this invention will be made clear from the following specification and claims.

The present invention is a new polymer-enhanced asphalt that utilizes effective amounts of each of two types of polymers or components thereof: a non-linear (e.g., multi-armed or multi-branched or radial) styrene/conjugated diene copolymer component, such as styrene/butadiene/styrene (SBS) copolymer, and a linear styrene/conjugated diene copolymer component such as SB copolymer, that, along with effective amounts of sulfur or other cross-linking agents, are all added to asphalt in order to enhance the final viscosity and ductility characteristics of the asphalt/polymer mix while minimizing overall polymer additives so as to minimize cost and maintain workability of the asphalt/ polymer mix. The present invention includes the composition of the additives, the resulting asphalt-polymer mix, as well as asphaltic concretes utilizing the asphalt/polymer mix, and also includes processes for formulation and emulsification of the compositions. Such emulsified bitumen-polymer compositions may be either anionic, cationic, or nonionic. The present invention forms what may be referred to as an asphalt dual polymer composite matrix.

The present invention unexpectedly provides enhanced asphalt performance characteristics at significantly lower levels of overall polymer. This results in greatly enhanced workability of the asphalt/polymer mix when achieving the same performance characteristics. Further, when necessary, this allows for enhanced durability-related properties while maintaining an acceptable level of overall polymer and, thus, acceptable workability. Moreover, this allows emulsification of asphalt/polymer mix at polymer levels which produce such desirable performance characteristics.

The present invention process includes a process for formulating a bitumen-polymer composition comprising combining from about 80 to about 99.5 percent by weight of an asphalt with from about 20 to about 0.5 percent by weight of a dual polymer mix, where the polymer mix comprises a radial copolymer component which is a radial styrene-conjugated diene block copolymer with a weight average molecular weight ($M_w$) between about 75,000 and 400,000 and a linear copolymer component which is a linear conjugated styrene-conjugated diene di-block copolymer with a weight average molecular weight ($M_w$) from about 50,000 to about 300,000, and where the radial copolymer and the linear copolymer are in the ratio of from about 50:50 by weight to about 2.5:97.5 by weight, respectively; adding from about 0.5 to about 10 percent by weight as compared to said polymer mix of elemental sulfur (preferably 1–6 percent, more preferably 2–4 percent by weight); mixing the asphalt, polymer mix and sulfur at a temperature of from about 280° F. to about 450° F. (138° C. to 232° C.) (preferably 350° F. to about 380° F. (177° C. to 193° C.)), and includes emulsifying the resulting composition with 20 to 40 percent added water and an emulsifying agent.

BRIEF DESCRIPTION OF THE DRAWING(S)

The FIGURE shows a graph of present invention emulsion viscosities and comparative asphalt emulsion viscosities.

DESCRIPTION OF INVENTION AND PREFERRED EMBODIMENTS

The composition of the present invention is a composition of asphalt, linear and radial styrene-conjugated diene copolymer components, and a reactant (typically sulfur). The present invention also includes the process for formulation and use of this composition either as a bitumen-polymer composition, or as an emulsified bitumen-polymer composition.

The asphalt used in the present invention may include the various substitute substances for standard crude oil residuum asphalt, including petroleum pitch, synthetic resin, re-refined lube oils and greases, shale oil derivatives, coal tar, petroleum extracts or similar substances used for commercial asphalt.

The present invention preferably is emulsified for various applications. Emulsification processes and materials used with the bitumen-polymer composition are those traditionally known by those skilled in the art. Typical cationic emulsified bitumen-polymer compositions can be made using known emulsifying agents such as primary amines, diamines, ethoxylated amines, propoxylated amines, imidazolene amines and the like. Typical anionic emulsified bitumen-polymer compositions can be made using emulsifying agents known by those skilled in the art such as salts produced from lignin-based, vinsol-based, or tall oil-based fatty acid raw materials. Similarly, nonionic emulsified bitumen-polymer compositions can be made using known nonionic emulsifying agents such as oxylated nonolphenols.

The linear and radial styrene-conjugated diene copolymer components for use in the present invention include:

Linear di-block styrene-butadiene copolymers (typically 50,000–350,000 molecular weight, $M_w$)

Linear tri-block styrene-butadiene copolymers (typically 50,000–400,000 molecular weight, $M_w$)

Radial block styrene-butadiene-styrene copolymers (typically 50,000–400,000 molecular weight, $M_w$)

The linear and radial copolymer components may be combined from separate copolymer sources, or produced together within a single copolymer as partially radialized linear copolymers. The copolymers used in the process according to the invention are block copolymers, comprising styrene groups and conjugated or partially conjugated diene groups. For example, the conjugated diene groups can be, among others, butadiene and isoprene. Needless to say, the copolymers may contain several different diene groups. Further, it is apparent that the copolymers could contain various styrene based blocks, elastomeric rubber-based blocks and other elastomeric components such as butadiene, isoprene, natural rubber, and mixtures thereof, or have functionalized polymer components containing functionalities such as carboxyl, aminated or epoxide functionalities.

The reactant which forms a part of this composition is used to link a portion of the bonds between copolymer molecules. For various cost and availability reasons, the typical reactant will be elemental sulfur. In addition, other reactants, such as hydrocarbylpolysulphides, sulfur-donating vulcanization accelerators and vulcanization accelerators which do not donate sulfur may be used.

When the linear di-block polymers and radial block polymers are simultaneously combined in asphalt, and then reacted with sulfur, significant property enhancements occur as compared to single sulfur-reacted copolymers. The enhancements are more than can be achieved by using individual unreacted typical di-, tri-, or radial block copolymers by themselves in asphalt, or than can be achieved by using individual typical di-, tri-, or radial block copolymers reacted with sulfur in asphalt.

The present invention consists of the incorporation of a styrene-conjugated diene linear block copolymer in concert with the utilization of a styrene-conjugated diene-styrene radial block copolymer at various proportions and molecular weights. This composition may be dissolved in various asphalt mediums. The mix of asphalt and dual copolymers is then vulcanized with the utilization of sulfur as a cross linking agent and electron donor. The product and material generated from this particular method/process generates a material that most definitely possesses characteristics which are unique only to this system.

Some work has been performed in the art with unreacted mixes of linear and radial copolymers combined with asphalt, apparently to enhance miscibility characteristics of the radial components. However, based upon prior experience, no particular significant benefits accrue with the unreacted mix similar to the benefits occurring in the present invention.

The present invention material yields exceptional synergistic effects with respect to softening points, as well as other properties for a given concentration of total polymer utilized and present in an asphalt mixture. Utilizing typical and common commercial asphalts, softening points have been observed to be in excess of 20° F. higher than that of typical single reacted polymer systems with essentially the same quantity of total polymer utilized. Additionally, when used in commercially available asphalt with undesirable characteristics which typically require a 6.25 to 6.5 percent by weight single reacted polymer loading, the present invention material yielded the same softening point as the control with nearly a 25 percent reduction of total polymer usage, thus again demonstrating a unique and unexpected synergy between the two types of polymers combined in the present invention.

Residues of asphalt emulsions (i.e., the asphalt-polymer components left after evaporation of the water in the emulsion) made from using conventional sulfur-reacted di-block polymers required about 30% more polymer in the composition to achieve force ductility elastic recoveries comparable to the elastic recoveries achieved when blends of di-block and radial polymers are used. Residues of sulfur reacted emulsified di-block/radial blends achieve softening points comparable to reacted blends produced merely using di-block polymers. In addition, emulsions of the present invention unexpectedly achieve equivalent or higher emulsion viscosity at lower residue content than conventional sulfur-reacted single polymer systems, which is an extremely desirable characteristic for application and use of the emulsion.

Depending upon the particular use characteristics to be met (e.g., SHRP range, viscosity, elasticity, softening point) varying amounts of linear and radial copolymer components may be used within the limits discussed herein. Thus, the composition of the preferred embodiment is comprised of effective amounts of linear and radial copolymers and a reactant and is emulsified with water utilizing effective amounts of an emulsification agent. As used herein, "effective amounts" indicates the percentages of the various components, asphalt, linear and radial copolymers, reactant, emulsification agent, and water to satisfactorily meet the performance criteria desired.

As discussed further below, other performance-related properties were evaluated with the present invention which include SHRP criteria, Rutting Resistance (Hamburg), force ductility, and other procedures normally used in determining elastomeric behavior and its effects.

Satisfactory results are anticipated for various applications for a total percent by weight of copolymer and reactant of 0.5 to 20 percent of the overall asphalt mix (asphalt and copolymer, excluding any aggregate). For use in many construction applications, a narrower mix of from about 1 to 10 percent may be appropriate to meet the constraints involved. In particular, where working viscosity of the asphalt mix is a concern, total percent weight of copolymer and reactant likely should be held to under 5 percent by weight of the overall asphalt mix.

Satisfactory emulsified embodiments of the present invention include from about 60 percent to about 80 percent by weight asphalt-polymer and reactant mix with about 40 percent to about 20 percent by weight water and an emulsifying agent. For special applications, such as for example thin film resurfacing, a greater or lesser amount of water may be used. Generally, the amount of water used is that amount which will give the emulsified mixture the desired flow characteristics to allow proper placement and, also, curing of the emulsion. Quantity and type of emulsifying agent typically is dictated by the ultimate use of the emulsion. Tests indicate that the quantity and type of emulsifying agents suitable for use with the present invention are consistent with existing asphalt and asphalt-polymer emulsions known in the art.

Without limiting variations, the general process of the present invention is that asphalt is preheated to a temperature of from about 280° F. to about 450° F. (138° C. to 232° C.) (preferably 350° F. to about 380° F. (177° C. to 193°C.)). The radial copolymer component is added to the asphalt and agitated until mixed. The linear copolymer component is added to the mixture and agitated for about 2–4 hours, or until an homogeneous dispersion is achieved. Sulfur is added to bring the sulfur level up to the desired concentration. Preferably, when sulfur is the reactant sulfur level desired is from about 0.5 percent to about 10 percent by weight of the total polymer weight. About thirty to sixty minutes of reaction time is desirable. Longer or shorter times may be necessary depending on the specific concentrations of asphalts and manufacturing system used. The final concentration of the present invention asphalt dual polymer composite matrix system may be adjusted using additional asphalt or other natural or synthetic diluents to meet the final desired performance properties.

Regarding an emulsified embodiment, preferably the asphalt, polymer, and reactant components are first mixed generally as described herein. Next, the reacted asphalt-polymer mix is introduced into an emulsification mill and heated to a temperature which will produce acceptable flow characteristics for the asphalt mix, and allow the final emulsion temperature to be maintained within acceptable limits. The water and emulsifier mixture typically are introduced separately from the asphalt mix into the emulsion mill and combined in it to form the emulsion. Generally, acceptable limits for the final combined temperature are from about 190° F. to about 210° F. (88° C. to 99° C.) so as to prevent flash boiling of the water. The mill operates to slice the asphalt-polymer mix finely and mix it with the water to form an emulsion. The emulsifying agent acts to stabilize the resulting emulsion so as to prevent agglomeration of the asphalt prior to placement.

EXAMPLES AND COMPARATIVES

The polymers shown in Tables 1–4 were blended into the asphalt, then unreacted sulfur was added and allowed to react for approximately 45 minutes. The polymers used for these examples are:

Linear conjugated styrene-butadiene di-block copolymer with typical molecular weight ($M_w$) of 100,000

Radial conjugated styrene-butadiene block copolymer with typical molecular weight ($M_w$) of 300,000

The asphalt tested in Tables 1, 2 and 4 was a standard, commercially available asphalt, AASHTO Table 2 Grade AC-20. Control samples were mixed with a single commercially available linear copolymer of the type noted and represent typical results for single reacted asphalt/copolymer systems.

TABLE 1

| Example | Asphalt (AC-20) (% wt) | Linear copolymer (% wt) | Radial copolymer (% wt) | Sulfur Ratio (Polymer/Sulfur by weight) | Softening Point (F.) | Force Ductility at 10 cm (Pounds) | Force Ductility at 30 cm Ratio | SHRP Temp Range (degree F.) | Elastic Recovery (%) | Aged Ductility (cm @ 39.2 F.) |
|---|---|---|---|---|---|---|---|---|---|---|
| Control 1 | 97.00 | 3.00 | 0.00 | 32.0:1 | 139.1 | 0.14 | 0.49 | — | 85.0 | 0.5 |
| Control 1A | 97.00 | 3.00 | 0.00 | 30.0:1 | — | — | — | 160.6 | — | — |
| Example 1 | 97.00 | 2.25 | 0.75 | 32.5:1 | 153.7 | 0.28 | 0.72 | 170.3 | 87.5 | 7.7 |
| Control 2 | 96.00 | 4.00 | 0.00 | 32.0:1 | 156.2 | 0.31 | 0.78 | — | 87.5 | 0.5 |
| Example 2 | 96.50 | 2.98 | 0.52 | 32.5:1 | 158.0 | 0.33 | 0.94 | — | 92.5 | 7.7 |
| Example 3 | 96.00 | 3.00 | 1.00 | 32.5:1 | 163.9 | 0.40 | 1.03 | — | 86.3 | 8.3 |

TABLE 2

| Sample # | Asphalt (AC-20) % Weight | Linear Copolymer % Weight | Radial Copolymer % Weight | Sulfur Ratio (Polymer/Sulfur) | SHRP Temp Range °F. |
|---|---|---|---|---|---|
| Comparative 1 | 96.55 | 3.45 | 0.0 | 28:1 | 181.8 |
| Comparative 2 | 97 | 2.55 | .45 | 28:1 | 192.6 |

Generally, examples #1, #2 and #3 demonstrate higher softening points and improved aged low temperature ductile capabilities using present invention reacted dual polymer system as compared to existing single reacted polymer systems. These very significant improvements indicate an increased performance life of the present invention.

The softening point information shown relates to the temperature at which the product asphalt first softens and is an indication of performance in use at higher temperatures (e.g., in the summer). The present invention consistently shows significant increase in this value for similar total polymer contents (control 1 vs. example 1—a 14.6° F. increase; control 2 vs. example 3—a 7.7° F. increase.) Also, similar softening points are achieved with significant reductions in total polymer content. (Example 1 vs. control 2; a 25 percent reduction in polymer results in only a 2.5° F. depression of the softening point.).

Other relevant criteria for asphalt performance is the Strategic Highway Research Properties (SHRP) tests. These tests indicate the visco-elastic and service performance related properties of asphalt composition and were developed to classify materials based upon performance. The SHRP test measures the spread between the low temperature service rating for the material (generally based upon embrittlement cracking) and the high temperature service rating for the material (generally based upon heat softening) to determine a service temperature range. The greater the SHRP temperature range rating, the greater the service range for the material. The SHRP information obtained in Table 1 indicates an increased temperature range of over 10° F. with the present invention as compared to that of a typical single copolymer formulation with a similar concentration of total copolymer. Additionally, Table 2 shows over a 10° F. enhancement in the present invention in the SHRP range for a smaller (3.45 vs. 3 percent) amount of total copolymer. Thus, this data illustrates a significant advantage in utilizing the present invention over the single reacted copolymers: that a typical single reacted copolymer formulation would require approximately an additional 2-3 percent total copolymer to be similar in SHRP performance to the present invention.

The performance differential indicated by the SHRP criteria was also observed by using a Hamburg Wheel tracking device. The Hamburg Wheel tests a material's rutting tendencies and performance life and how a binder (here the asphalt/polymer) influences these criteria. Tests indicate that the present invention with a 3–3.5 percent by weight total copolymer achieved the same results as a typical single reacted copolymer at a 5 percent by weight concentration.

Force ductility tests indicate flow resistance under load and were conducted at 77° F. as is called for in various government asphalt testing requirements. The results in Table 1 indicate a significantly better (increased) resistance to flow with equivalent amounts of total copolymer. To put these results in perspective, some government specifications currently require a minimum of 0.25 pounds force ductility for the 10 cm test. The conventional single copolymer shown required about 4 percent copolymer to satisfy this criteria. However, samples at this level of total copolymer were observed to have significant separation problems (separation of copolymer from asphalt, producing surface failures). The present invention meets the same criteria with about 25 percent less total copolymer and without the separation problems experienced with the single copolymer.

Elastomeric properties or elastic recovery is another indication of performance. The Table 1 test results indicate that the dual copolymer material generally meets or exceeds similar amounts of a single reacted copolymer. Other tests indicate that the present invention generally achieves significantly greater elastic recovery ratios than a single reacted copolymer for the same overall polymer loading, further indicating very favorable elastic properties of the present invention.

Table 3 outlines typical elastic recovery and softening point results from cationic and anionic asphalt emulsions produced using polymer modified asphalts containing a single polymer versus those containing blended polymers. The asphalt tested in Table 3 was a standard, commercially available AASHTO Table 2 asphalt. These Table 3 emulsions were manufactured using conventional asphalt emulsion technology. Cationic soap solutions containing 0.17 to 0.30 percent by weight of a primary- and a di-amine based emulsifier were milled together with asphalt to produce these cationic asphalt emulsions. The anionic emulsions were prepared using soap solutions containing 0.25 to 0.50 percent conventional Tall Oil Fatty Acids (TOFA) by weight of emulsion. In these examples, the soap solutions were heated to 100° F. to 120° F. (38° C. to 49° C.) and milled together with 300° F. to 310° F. (149° C. to 154° C.) asphalt. Mill discharge temperatures ranged between 205° F. to 210° F. (96° C. to 99° C.).

Polymer loadings for the blended polymer systems were adjusted downward to achieve comparable elastic recoveries to those of the single polymer-based systems. A target elastic recovery between 53 percent to 55 percent was used for this evaluation. The examples in Table 3 demonstrate that comparable levels of elastic performance are attained with significantly lower polymer levels when a combined linear/radial-based system is employed.

TABLE 3

All Elastic Recoveries Range Between 53–55%

| Example | Asphalt (wt %) | Total Polymer (wt %) | Linear Copolymer (wt %) | Radial Polymer (wt %) | Polymer to Sulfur (wt %) | Softening Point (°F.) |
|---|---|---|---|---|---|---|
| Cationic Emulsion Control | 98.0 | 2.0 | 2 | 0 | 30:1 | 111 |
| Cationic Example 4 | 98.5 | 1.5 | 1.28 | 0.23 | 28:1 | 111 |
| Anionic Emulsion Control | 98.0 | 2.0 | 2 | 0 | 30:1 | 111 |
| Anionic Example 4 | 98.5 | 1.5 | 1.28 | 0.23 | 32:1 | 111 |

As discussed above, working viscosity increases significantly with increased polymer loading. In Table 4, examples 5 and 6 demonstrate that the present invention experiences similar increases in viscosity, here measured by standard Brookfield viscosity tests, and is in the same range of values (example 6 vs. comparative 3). However, because the present invention achieves required operating characteristics using smaller amounts of total polymer, the working viscosity using the present invention will be lower, significantly enhancing the constructability characteristics for the desired application.

TABLE 4

| Sample # | Asphalt (AC-20) % Weight | Di-block copolymer, % Weight | Radial copolymer % Weight | Sulfur Ratio (Polymer/Sulfur) | Brookfield Viscosity (Centipoise @ 135° C.) |
|---|---|---|---|---|---|
| Example 5 | 97 | 2.25 | .75 | 32.5:1 | 1120 |
| Example 6 | 96 | 3.0 | 1.0 | 32.5:1 | 1730 |
| Comparative 3 | 96 | 4 | 0.0 | 30:1 | 1840 |
| Comparative 4 | 95 ¾ | 4 ¼ | 0.0 | 32:1 | 2373 |
| Comparative 5 | 94 | 6 | 0.0 | 30:1 | 4200 |

Results of commercial plant scale test runs for both comparative single polymer asphalt emulsions and the blended polymer systems of the present invention are shown in Table 5 and the FIGURE. The FIGURE graphically displays the data contained in Table 5. Consistent asphalt source materials and emulsifier levels were employed to generate these emulsions. Comparison was made between emulsions of single polymer asphalts and dual polymer asphalts of the present invention with equivalent final performance characteristics such as plasticity and softening point at a nominal 20 to 25 percent by weight reduction in overall polymer content. These tests indicate that asphalt emulsions of the present invention unexpectedly demonstrate significantly higher Saybolt Fural Seconds (SFS) viscosities of the emulsions at equivalent to lower emulsion residue concentrations than single polymer asphalts. Generally stated, higher SFS viscosity is desirable. The SFS viscosity is a measure of how easily the emulsion may be handled and spread to provide the desired coverage. The higher viscosity material is "thicker" when applied and tends to allow better coverage and handling than lower SFS viscosity emulsions. These tests were run on both anionic and cationic asphalt emulsions and demonstrate similar performance improvements in both types of emulsions.

TABLE 5

| Emulsion Type | Total % Polymer | % Di-block Polymer | % Radial Polymer | % Emulsion Residue | Viscosity (SFS) |
|---|---|---|---|---|---|
| Cationic Single Polymer | 2.10% | 100.0% | 0.0% | 67.8% | 296 |
| | | | | 68.0% | 533 |
| | | | | 68.5% | 472 |
| | | | | 69.4% | 556 |
| Cationic Dual Polymer | 1.73% | 82.5% | 17.5% | 66.0% | 342 |
| | | | | 67.0% | 1017 |
| Anionic Single Polymer | 2.10% | 100.0% | 0.0% | 65.0% | 335 |
| | | | | 65.0% | 368 |
| | | | | 66.4% | 531 |
| Anionic Dual Polymer | 1.73% | 83.5% | 17.5% | 64.3% | 492 |
| | | | | 64.5% | 735 |
| | | | | 64.8% | 780 |
| | | | | 66.8% | 921 |

As is demonstrated in these examples, overall the dual polymer approach of the present invention represents a significant enhancement in asphalt emulsion technology. For example, for a given set of plasticity and softening point requirements in the final asphaltic product, see Tables 1–3, the total polymer content of the present invention may be reduced about 20 to 25 percent as compared to a single polymer product. This both produces an asphalt-polymer blend which is more easily handled and emulsified than single polymer products, and also costs significantly less to produce because of the lower polymer content. As shown in Table 5 and the FIGURE, the dual polymer product of the present invention produces an emulsion which has enhanced handling properties at reduced residue content as compared to the single polymer emulsion, producing a more desirable product. Thus, in summary, these examples reveal that the present invention represents a significant advancement in both workability of the emulsion as well as durability of the final product at an overall reduced cost.

From the foregoing, it will be seen that this invention is well-suited to attain all the ends and objects set forth herein together with other advantages which are obvious and inherent to the invention.

It will be understood that certain features and combinations are of utility and may be employed without reference to other features and combinations. This is contemplated and within the scope of the invention.

Since many possible embodiments may be made of the invention without departing from the scope thereof, it is to be understood that all matters herein set forth or shown in the accompanying drawings are to be interpreted as illustrative and not in a limiting sense.

What is claimed is:

1. An emulsified asphalt-polymer composition comprising:

asphalt;

effective amounts to produce the desired performance characteristics of a polymer-sulfur mix combined with said asphalt, where said polymer-sulfur mix is comprised of a radial copolymer which is a radial styrene-conjugated diene block copolymer with a weight average molecular weight ($M_w$) between about 75,000 and 400,000 and a linear copolymer which is a linear styrene-conjugated diene di-block copolymer with a weight average molecular weight ($M_w$) from about 50,000 to about 300,000 and where said radial copolymer and said linear copolymer are in a ratio effective to of from about 50 to 50 percent by weight to about 2.5 to 97.5 percent by weight, respectively;

effective amounts of sulfur required to meet desired performance characteristics; and effective amounts of an emulsifying agent and water to allow emulsification of the resulting composition.

2. An emulsified asphalt-polymer composition comprising:

an asphalt;

a polymer-sulfur mix, where said polymer-sulfur mix is comprised of a radial copolymer which is a radial styrene-conjugated diene block copolymer with a weight average molecular weight ($M_w$) between about 75,000 and 400,000, a linear copolymer which is a linear styrene-conjugated diene di-block copolymer with a weight average molecular weight ($M_w$) from about 50,000 to about 300,000, where said radial copolymer and said linear copolymer are in the ratio of from about 50 to 50 percent by weight to about 2.5 to 97.5 percent by weight, respectively, and sulfur in the amount of about 0.5 to about 10 percent by weight of the polymer-sulfur mix, and wherein said asphalt and said polymer-sulfur mix are in the ratio of from about 80 to 20 percent by weight to about 99.5 to 0.5 percent by weight, respectively; and effective amounts of an emulsifying agent and water to allow emulsification of the resulting composition.

3. An emulsified asphalt-polymer composition as claimed in claim 2, wherein said asphalt and said polymer-sulfur mix are in the ratio of from about 90 to 10 percent by weight to about 99 to 1 percent by weight, respectively, and said sulfur percent is from about 2 to about 4 percent by weight of said polymer-sulfur mix.

4. An emulsified asphalt-polymer composition as claimed in claim 2, wherein said asphalt and said polymer-sulfur mix are in the ratio of from about 95 to 5 percent by weight to about 99 to 1 percent by weight, respectively, said sulfur percent is from about 2 to about 4 percent by weight of said polymer-sulfur mix, and where said radial copolymer and said linear copolymer are in the ratio of from about 25 to 75 percent by weight to about 2.5 to 97.5 percent, respectively.

5. An emulsified asphalt-polymer composition as claimed in claim 2, wherein said sulfur is part of a cross-linking system donating sulfur in a quantity such as to provide from about 0.5 to about 10 percent by weight of sulfur relative to the weight of the elastomeric polymer of the bitumen/polymer component.

6. An emulsified asphalt-polymer composition as claimed in claim 2, wherein said emulsifying agent is cationic.

7. An emulsified asphalt-polymer composition as claimed in claim 2, wherein said emulsifying agent is anionic.

8. An emulsified asphalt-polymer composition as claimed in claim 2 wherein said emulsifying agent is nonionic.

9. An emulsified asphalt-polymer composition as claimed in claim 2, wherein the total water and emulsifier percent by weight of the resulting composition is from about 20 to about 40.

10. An emulsified asphalt-polymer composition comprising:

an asphalt;

a polymer-cross-linking reactant mix, where said polymer-cross-linking reactant mix is comprised of a radial copolymer which is a radial styrene-conjugated diene block copolymer with a weight average molecular weight ($M_w$) between about 75,000 and 400,000, a linear copolymer which is a linear styrene-conjugated diene di-block copolymer with a weight average molecular weight ($M_w$) from about 50,000 to about 300,000, where said radial copolymer and said linear copolymer are in the ratio of from about 50 to 50 percent by weight to about 2.5 to 97.5 percent by weight respectively, and a cross-linking agent in the amount of about 0.5 to about 10 percent by weight of the polymer-cross-linking reactant mix, wherein said cross-linking agent is selected from the group consisting of elemental sulfur, hydrocarbylpolysulphides, sulfur-donating vulcanization accelerators and vulcanization accelerators which do not donate sulfur, wherein said asphalt and said polymer-cross-linking reactant mix are in the ratio of from about 80 to 20 percent by weight to about 99.5 to 0.5 percent by weight, respectively; and effective amounts of an emulsifying agent and water to allow emulsification of the resulting composition.

11. A process for formulating an emulsified asphalt-polymer composition comprising:

combining from about 80 to about 99.5 percent by weight of an asphalt with from about 20 to about 0.5 percent by weight of a polymer-cross-linking reactant mix to form an asphalt-polymer composition, wherein said polymer-cross-linking reactant mix is comprised of a radial copolymer which is a radial styrene-conjugated diene block copolymer with a weight average molecular weight ($M_w$) between about 75,000 and 400,000, a linear copolymer which is a linear styrene-conjugated diene di-block copolymer with a weight average molecular weight ($M_w$) from about 50,000 to about 300,000, with said radial copolymer and said linear copolymer being present in a ratio of from about 50 to 50 percent by weight to about 2.5 to 97.5 percent by weight, respectively, and a cross-linking agent in the amount of about 0.5 to about 10 percent by weight of the polymer-cross-linking reactant mix, wherein the cross-linking agent is selected from the group consisting of elemental sulfur, hydrocarbylpolysulphides, sulfur-donating vulcanization accelerators and vulcanization accelerators which do not donate sulfur;

mixing the asphalt, polymer mix and cross-linking agent together; and combining effective amounts of an emulsifying agent and water to allow emulsification of the resulting mixture.

12. A process for formulating an emulsified asphalt-polymer composition as claimed in claim 11, wherein the mixing the asphalt, polymer mix and sulfur together occurs at a temperature of about 350° F. to about 380° F.

13. A process for formulating an emulsified asphalt-polymer composition as claimed in claim 11, wherein said asphalt percent by weight is from about 90 to about 99 percent by weight of the asphalt-polymer composition and said polymer-sulfur mix is from about 10 to about 1 percent by weight of the asphalt-polymer composition, and said sulfur percent is from about 2 to about 4 percent by weight of said polymer-sulfur mix.

14. A process for formulating an emulsified asphalt-polymer composition as claimed in claim 11, wherein said asphalt percent by weight is from about 95 to about 99 percent by weight of the asphalt-polymer composition and said polymer-sulfur mix is from about 5 to about 1 percent by weight of the asphalt-polymer composition, said sulfur percent is from about 2 to about 4 percent by weight of said polymer-sulfur mix, and where said radial copolymer and said linear copolymer are in the ratio of from about 25 to 75 percent by weight to about 2.5 to 97.5 percent, respectively.

15. A process for formulating an asphalt-polymer composition as claimed in claim 11, wherein said sulfur is part of a cross-linking system donating sulfur in a quantity such as to provide from about 0.5 to about 10 percent by weight of sulfur relative to the weight of the elastomeric polymer of the bitumen/polymer component.

16. A process for formulating an asphalt-polymer composition as claimed in claim 11, wherein the mixing the asphalt, polymer mix and sulfur together occurs at a temperature of about 280° F. to about 450° F.

17. The process for formulating an emulsified asphalt-polymer as claimed in claim 11, wherein the emulsifying agent is cationic.

18. The process for formulating an emulsified asphalt-polymer as claimed in claim 11, wherein the emulsifying agent is anionic.

19. The process for formulating an emulsified asphalt-polymer as claimed in claim 11, wherein the emulsifying agent is nonionic.

* * * * *